United States Patent [19]

Hwang et al.

[11] Patent Number: 6,058,122

[45] Date of Patent: May 2, 2000

[54] DEVICE FOR SPLITTING A SCREEN IN MPEG IMAGE SIGNALS AT A COMPLETELY COMPRESSED DOMAIN AND THE METHOD THEREOF

[75] Inventors: Dae Hwan Hwang; Jong Hyeong Lee; Young Duk Park, all of Daejeon; Kyu Seob Cho, Ansan, all of Rep. of Korea

[73] Assignees: Electronics and Telecommunications Research Institute, Daejeon; Korea Telecom, Seoul, both of Rep. of Korea

[21] Appl. No.: 09/102,006

[22] Filed: Jun. 22, 1998

[30] Foreign Application Priority Data

Aug. 12, 1997 [KR] Rep. of Korea ...................... 97-38330

[51] Int. Cl.[7] ....................................................... H04J 3/12
[52] U.S. Cl. ........................................... 370/522; 370/537
[58] Field of Search ................................... 370/522, 402, 370/410, 411, 263; 348/15, 17

[56] References Cited

U.S. PATENT DOCUMENTS 5,408,274  4/1995  Chang et al. .
5,453,780  9/1995  Chen et al. ............................... 348/15
5,600,646  2/1997  Polomski ................................. 370/263

*Primary Examiner*—Huy D. Vu
*Assistant Examiner*—Alexander Boakye
*Attorney, Agent, or Firm*—Jacobson, Price, Holman & Stern PLLC

[57] ABSTRACT

The invention provides a method of multiplexing moving pictures fed from a plurality of multimedia communication terminals through broadband Integrated Service Distance Network (B-ISDN) and displaying a multiplexed moving picture on a display unit of the plurality of terminals, which comprising the steps of checking a type and a performance of the terminals, and assistance possible performance of the MCU to the terminals by end-and-end signaling; and selecting M terminals among the plurality of terminals connected thereto; generating a start signal to the selected M terminals, the start signal allowing each of the selected terminals to generate the moving picture to be processed; processing a first and second moving pictures generated from two terminals in response to the start signal; processing a third and four moving pictures generated from two terminals in response to the start signal; repeating said steps until all of moving pictures from the selected M terminals are inputted.

4 Claims, 13 Drawing Sheets

DEVICE FOR SPLITTING A SCREEN IN MPEG IMAGE SIGNALS AT A COMPLETELY COMPRESSED DOMAIN AND THE METHOD THEREOF

BACKGROUND OF THE INVENTION

1. Field of the Invention

The present invention relates to digital video signal processing; and more particularly, to a device for splitting a screen expressed in moving picture signals compressed by MPEG (Moving Picture Expert Group) on a completely compressed domain by employing an non-transcoding technique, in image processing functions of a Multipoint Control Unit (MCU) which is adapted to provide multipoint multimedia communication services to a plurality of multipoint multimedia communication terminals, in broadband ISDN, and the method thereof.

2. Description of the Prior Art

Recently, multimedia services in the broadband ISDN have been further embodied to provide improved serviceable functions to users, as applications such as Asynchronous Transfer Mode (ATM) switches and transmission systems corresponding to a lower concept in the broadband ISDN have been broadly studied and Audio/Video compressed standard is determined by ITU-T, ISO/IEC.

In future, various multimedia services may be extended to applications such as communication/distribution services, e.g., Video-On-Demand (which is referred to as "VOD" hereinafter) and interactive series, e.g., video-telephone and Tele-conference.

The interactive multimedia communication services has been embodied recently by the ITU-T a standard for multimedia communication terminals with H.320 series available in various networks, based on H.261 image compression coding technique. In Digital Audio Video International Council (DAVIC), a standard of VOD type of service system have been defined through the use of the MPEG standard of ISO/IEC. In a type of the multimedia communication terminals, the interactive services employs the H.261 standard compression technique and the communication/distribution service applications such as the VOD incorporates the MPEG standard compression technique. On the other hand, various communication services and multimedia communication terminals, which is combined together with standards previously described, may be introduced as a terminal based on the MPEG standard of ISO/IEC is standardized by the ITU-T, and an interactive bi-directional communication service is utilized to the DAVIC and the like.

More particularly, MPEG-2 in the ISO/IEC have being directly applied to service applications such as Cable Television (CATV), digital TV broadcast and the VOD, wherein the services is available in terms of Set-Top Box (which is referred to as "STB" hereinafter) already completed a specification and a standard. Such STM may be incorporated applications such as TV, Video Cassette Recorder (VCR) and Personal Computer (PC) which have broadspreadly been popularized to individual user. Based on the STB, users are capable of utilizing various multimedia communication services on the broadband ISDN on a real time basis. Provision of the interactive communication series such as video-telephone and Tele-conference to an user, however, is possible by using only H.320 terminals according to a type of corresponding network. As a result, there is a drawback that the users currently using such STB have to purchase the H.320 terminals to use the interactive communication services. In this case, therefore, an MPEG coding module is applied to the STB incorporating therein a network interface function and an MPEG decoder, thereby allowing the user to efficiently utilize the bi-directional multimedia communication service. In the multimedia communication terminals, various types of media signals and it combined signals may be utilized depending on service applications and characteristics of devices incorporated therein. The MCU for providing the multipoint multimedia communication service has a need of structure adapted to various media signal processing. To accomplish this, the present invention provides an MPEG based moving picture processing among various media signal processing functions.

The conventional Multipoint Control Unit incorporating an image processor therein has two functions; i.e., one is a switching function of switching moving pictures generated from a plurality of multimedia communication terminals connected thereto to distribute to a preset location, and the other is a screen splitting function of allowing a multiplicity of input moving pictures to be displayed on a simple screen.

In the screen splitting function, there is a merit that the MCU carries out the multiplicity of input moving pictures and transmits the same to each terminal, to thereby allow each terminal's user to concurrently see each of the input moving pictures on the same screen. Such screen splitting function is useful for multimedia communication service applications such as multipoint video-conference systems. Since, however, the conventional MCU incorporating the image processor therein mainly employs screen-splitting technique based on PEL (Pixel element) domain, which is provided with encoders and decoders corresponding to the number of input/output connection communication terminals, respectively, the MCU results in a completely structure.

The conventional screen-splitting technique is based on a Transcoding technique, which is converts a compressed image inputted from the MCU into an image data on the PEL domain through the use of a moving picture decoder, and performs Scaling, filtering and reordering processes on a converted PEL image data, followed by a compression process using a moving picture encoder to thereby generate a compressed signal to be transmitted to video-conference participants terminals. In such transcoding technique, however, the moving picture signal can be adaptively treated, while an image processor with a complicated structure consisting of a number of decoders and encoders must be integrated on the MCU.

In addition, an iterative performance of decoding and encoding processes results in a degradation in picture quality, i.e., degradation in a Quality of Service (QoS).

Especially, QoS of the interactive communication service on a real-time basis has a limitation, due to a delay invoked by a buffer for transmitting output generated from an encoder with a traffic characteristic of variable bit in a constant bit rate, and a delay invoked during encoding and decoding processing. In case the transcoding technique is used for the screen-splitting function of the MCU, a total delay element induced by a sequence of a transmission terminal, a network, the MCU and a reception terminal, should be considered.

In addition, the screen-splitting technique previously described has shortcomings that delay resulting from the iterative encoding and decoding operations prevents the multipoint multimedia Communication services from being provided to the users on the real time basis, wherein most of the delay is occurred between transmitting terminal and a receiving terminal except the MCU.

Further, in the conventional screen-splitting technique which is not applied the decoding and encoding operations at the completely compressed domain, there has been studied only H.261 moving picture signals, but there have not been studied with respect to MPEG based on moving pictures, which is differed from compression manner for the H.261 and also encoding syntax configuration for moving pictures.

SUMMARY OF THE INVENTION

It is, therefore, a primary object of the present invention to provide a device which is capable of splitting a screen expressed in MPEG compressed moving pictures at a completely compressed domain, without the use of decoders and encoders, in broadband ISDN, to thereby reduce a degradation in picture quality resulting from the screen-splitting process, and also minimize delay invoked during the screen-splitting process based on non-transcoding technique, which in turn, lead to provide multipoint multimedia communication services employing therein Multipoint Control Unit (MCU) on a real time basis to users.

In accordance one aspect of with the invention, there is provided a device for multiplexing N media signals fed from a plurality of multimedia communication terminals through broadband Integrated Service Distance Network (B-ISDN) to be displayed same on a display unit of the plurality of terminals, by using a Multipoint Cotrol Unit (MCU) wherein N being a positive integer, the device comprises: first network interface means for interfacing the N media signals from the plurality of multimedia communication terminals through the B-ISDN; pre-processing means for receiving the N media signals from the first network interface means, and demultiplexing the same into a preset number of streams with audio, video or data; a screen-splitting processing means for operating and reordering the preset number streams fed from the pre-processing means at a completely compressed domain to obtain a screen formed by the preset number streams, to thereby split the screen; a post-processing means for multiplexing the screen fed thereto from the screen-splitting processing means into N multiplexed screens corresponding to the terminals; and a second network interface means for outputting the multiplexed screens fed thereto from the post-processing means to the multimedia communication terminals, respectively.

Preferably, the screen-splitting processing means includes input buffers for temporally storing the preset number stream fed thereto from the first network interface means; a screen operating/reordering block for sequentially retrieving each stream stored in corresponding input buffer, and operating and reordering the same in a frame arrangement order to generate a combined screen with moving pictures; and a output buffer for temporally storing the combined screen to be outputted to the post-processing means.

In accordance with another aspect of the present invention, there is provided a method of multiplexing moving pictures fed from a plurality of multimedia communication terminals through broadband Integrated Service Distance Network (B-ISDN) and displaying a multiplexed moving picture on a display unit of the plurality of terminals, by using a screen-splitting device in a Multipoint Control Unit (MCU) including a first network interface circuitry for interfacing a plurality of media signals from the plurality of multimedia communication terminals through broadband Integrated Service Distance Network (B-ISDN); a pre-processor for demultiplexing the media signals fed thereto from the first network interface circuitry into a preset number of streams with audio, video or data; a screen-splitting processor for operating and reordering the preset number streams fed from the pre-processing means at a completely compressed domain to obtain a screen formed by the preset number streams, to thereby split the screen; a post-processing circuitry for multiplexing the screen fed thereto from the screen-splitting processing circuitry into N multiplexed screens corresponding to the terminals; and a second network interface circuitry for outputting the multiplexed screens fed thereto from the post-processing means to the multimedia communication terminals, respectively, wherein N being a positive integer, which comprising the following steps; checking a type and a performance of the terminals, and assistance possible performance of the MCU to the terminals by end-and-end signaling; and selecting M terminals among the plurality of terminals connected thereto; generating a start signal to the selected M terminals, the start signal allowing each of the selected terminals to generate the moving picture to be processed; processing a first and second moving pictures generated from two terminals in response to the start signal; processing a third and four moving pictures generated from two terminals in response to the start signal; repeating said steps until all of moving pictures from the selected M terminals are inputted.

In addition, the step of processing the first and second moving pictures includes; modifying slice information contained in the first moving picture provided from the first terminal; deleting information for a sequence layer and a picture layer contained in a first Slice of the second moving picture, and newly modifying by a predetermined value a value of the MBAI which is a variable code of macroblock layer; appending a required stuffing bit to a new MBAI value to be matched a byte sequence of the code, as the MBAI value is varied; and checking whether both of the first and second moving pictures are completely processed, repeating the above steps until it are completely processed, if not so.

Preferably, the step of processing the third and four moving pictures includes; deleting information for a sequence layer and a picture layer contained in a first Slice of the third moving picture, and newly modifying a value of Slice-Start-Code (SSC) to obtain a continuous slice; deleting information for a sequence layer and a picture layer information contained the four moving picture, and newly modifying both of the SSCI and MBAI values by a preset value, respectively; appending a required stuffing bit to a new MBAI value to be matched a byte sequence of the code, as the MBAI value is varied; and checking whether both of the third and four moving pictures are completely processed, repeating the above steps until it are completely processed, if not so.

Preferably, the predetermined value used in modification of the MBAI values and the preset value used in modification of the SSC values are identically applied in next modification.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
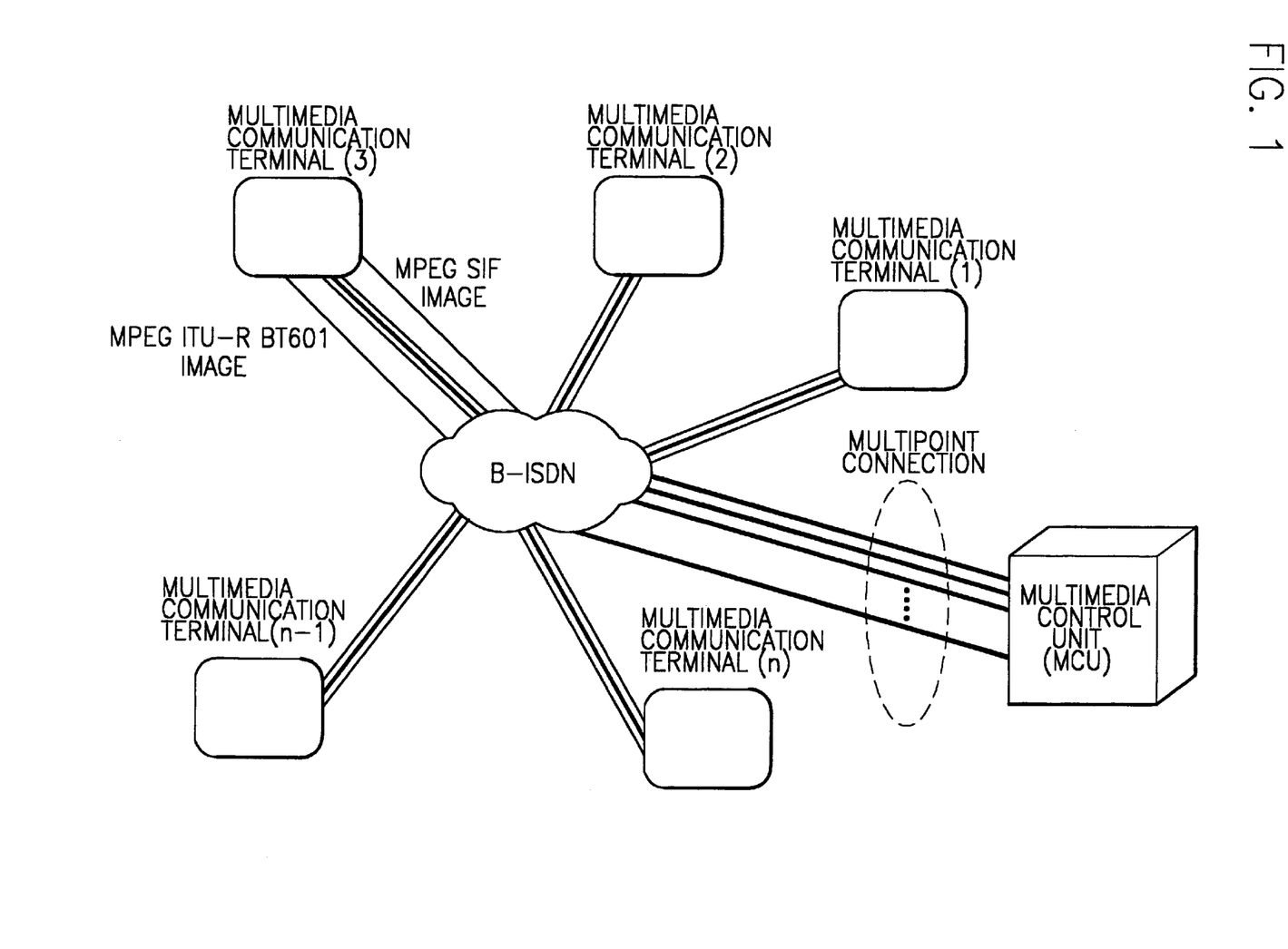
FIG. 1 depicts a exemplary diagram showing a multipoint multimedia communication employing a Multipoint Control Unit (MCU) in broadband ISDN.

Referring now to FIG. 1, there is illustrated a schematic diagram showing a device of splitting image screens fed from a multiplicity of participant's terminals into a simple screen, when a number of terminals are connected to an Multipoint Control unit (MCU) for multipoint connection in broadband ISDN environment.

When the number of terminals utilizing therein MPEG moving pictures compression technique are coupled with the MCU, the present invention selects four participants among the multiplicity of participants, receives moving pictures from each of the participant's terminals and performs the screen-splitting process. In this case, the multimedia communication terminals transmits moving pictures to the MCU in MPEG SIF format and the MCU provides screen-splitted pictures to the respective terminals in MPEG ITU-R BT601 format.

Figure 2:
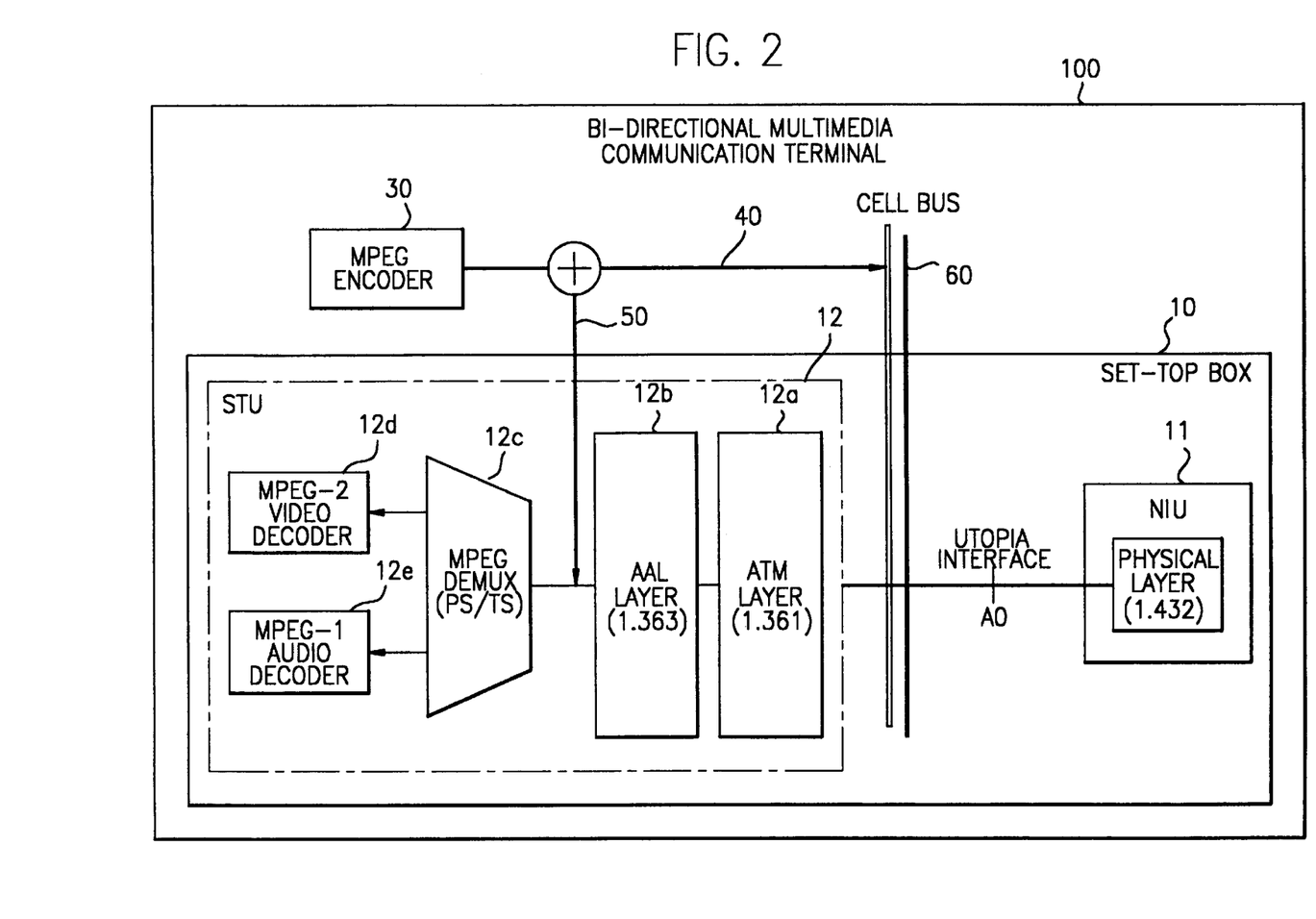
FIG. 2 offers a block diagram of bi-directional multimedia communication terminals utilizing Digital Audio Video International Council (DAVIC) STB device.

Referring to FIG. 2, there is a block diagram of bi-directional multimedia communication terminals utilizing Digital Audio Video International Council (DAVIC) STB device, wherein an MPEG encoder may be provided therein through A0 interface inside the STB standardized by the DAVIC previously described, or an encoder 30 may be connected to an AAL layer 12b within an Set-Top Unit (STU) 12. The STU 12 includes an ATM layer 12a, the AAL layer 12b, an MPEG demultiplexer 12c, an MPEG-2 decoder 12d for decoding audio/video signals inputted thereto from the MPEG demultiplexer 12c, and an MPEG-1 decoder 12e.

In case of the former, since a function module for an interactive multimedia communication is directly connected to a Cell bus 60 corresponding to a Network Interface Unit (NIU) 11 containing only the physical layer, it suffers from the disadvantage that it must be incorporated therein functions for processing the ATM layer 12a and the AAL layer 12b in addition to the encoder 30. However, since signal format and connection manner of the A0 interface, which is defined at the STU 12 are still employed as a correct signal format at the DAVIC, it is possible to overcome a problem of changing in an inner hardware structure of the STB.

Figure 5:
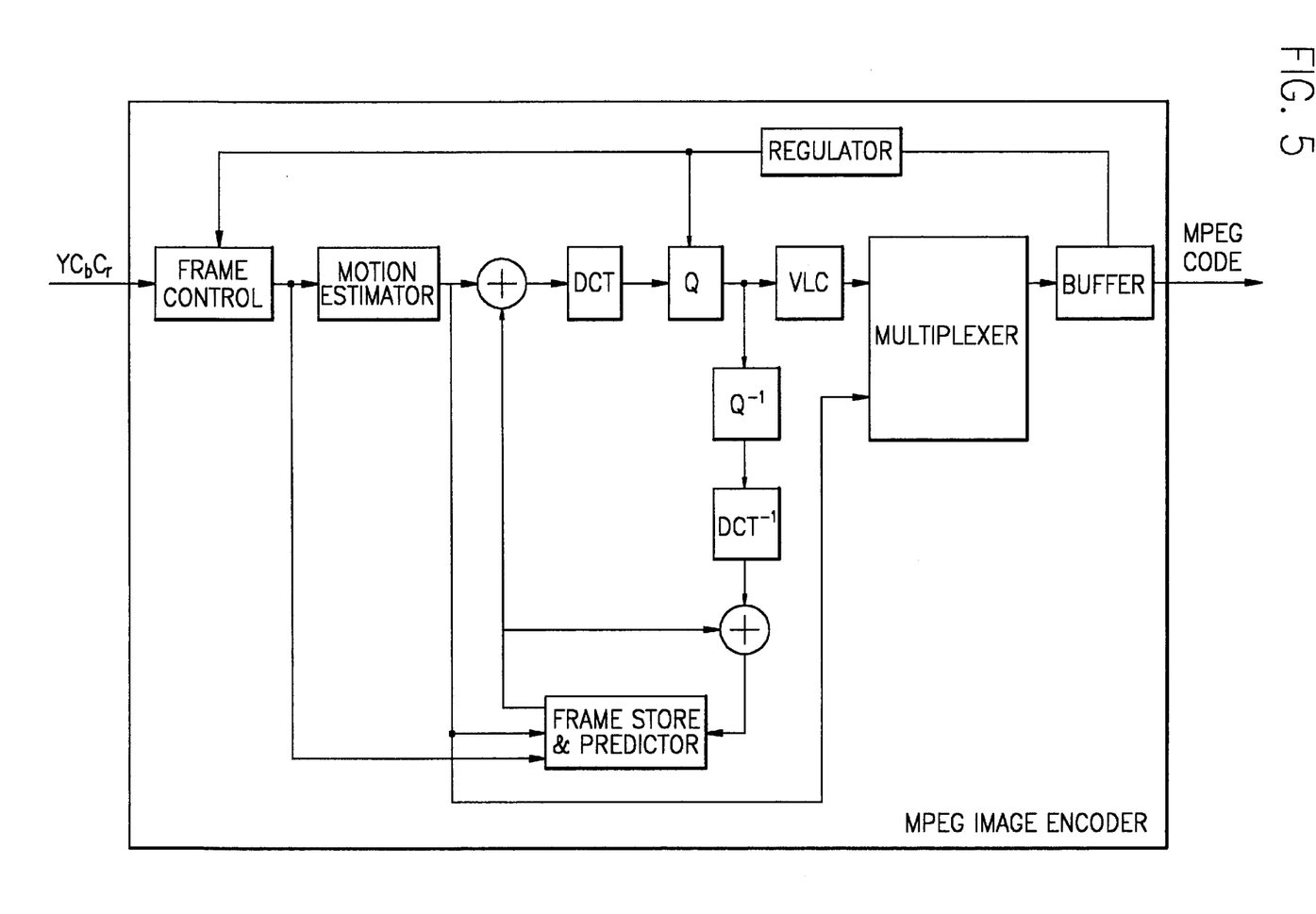
FIG. 5 depicts a schematic block diagram of the conventional MPEG image encoder.

In the meantime, the latter is a method that the encoder 30 is directly coupled to the AAL layer 12b, while associated interfaces have not been currently defined on the DAVIC. However, in case the STB is integrated on universal personal computers, an MPEG encoder shown in FIG. 5 may be organized without the occurrence of any problem when a module having the MPEG encoder and a miltiplexer is installed on a slot of the PC and an AAL-5 is used for the data transmission thereof. the MPEG encoder 30 may be connected along two different paths, numbered 40 and 50 as shown In FIG. 2 depending on the installation position thereof.

As described above, by adding MPEG-1 encoding function to the above-mentioned STB, users are capable of utilizing distribution/communication possible VOD services as well as the interactive communication services such as video-telephone and teleconference with lower cost.

Figure 3:
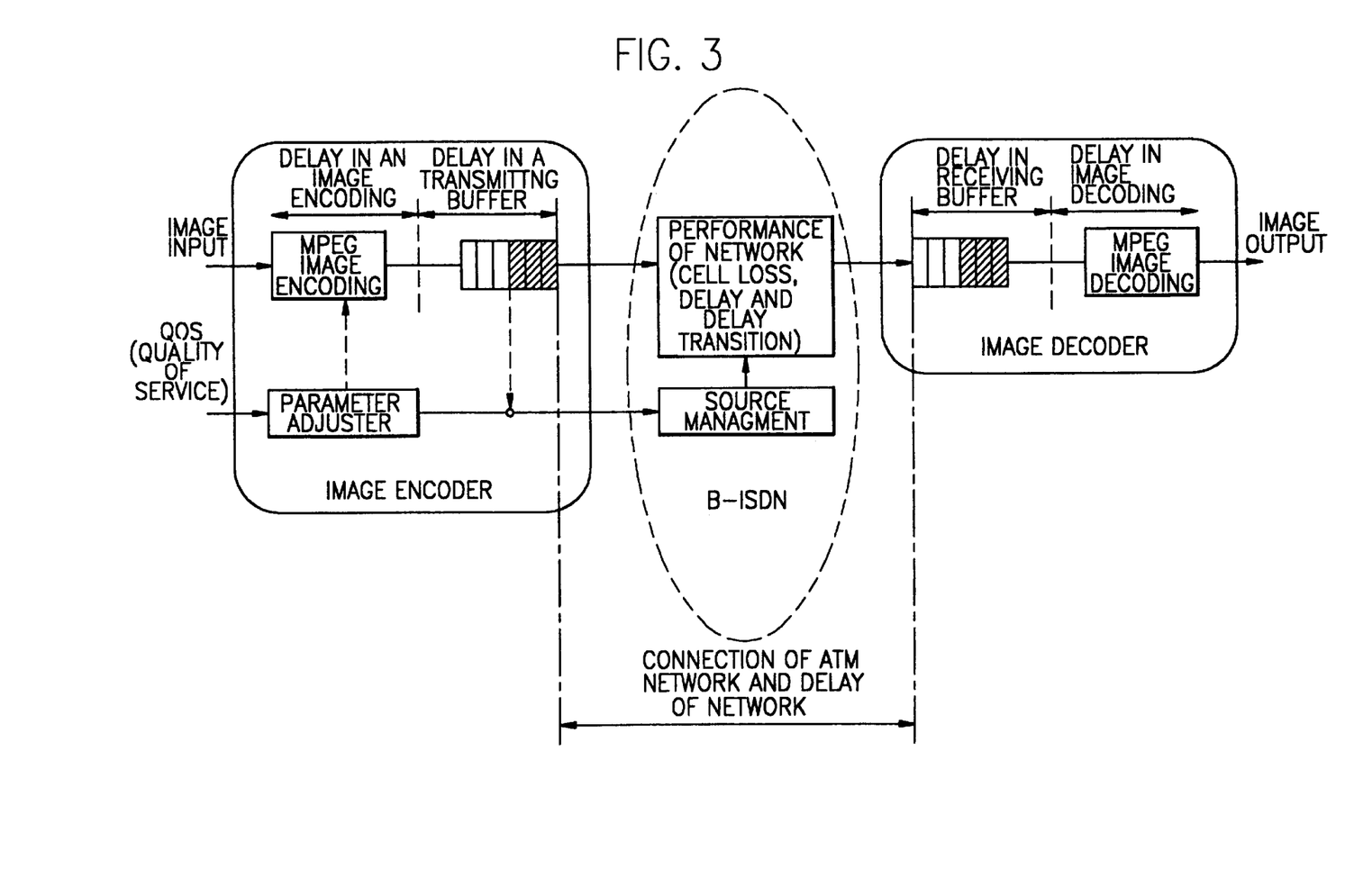
FIG. 3 exemplifies a diagram depicting one-way delay elements generated between a transmission terminal and a reception terminal, during the video-conference communication in the broadband ISDN.

Referring to FIG. 3, there is shown a diagram depicting one-way delay elements generated between a transmission terminal and a reception terminal, during the video-conference communication in the broadband ISDN, wherein the total delay may be defined by a sum of delays in the transmission terminal, that in the reception terminal and that associated with the network. Recently, one-way maximum delay allowance value is 150 ms. Considering delay invoked by a transmission buffer employed when the moving picture signals is transmitted at a constant bit rate format in the broadband ISDN, it is extremely impossible to guard the limited value, i.e., 150 ms, in an end-to-end signaling.

Figure 4:
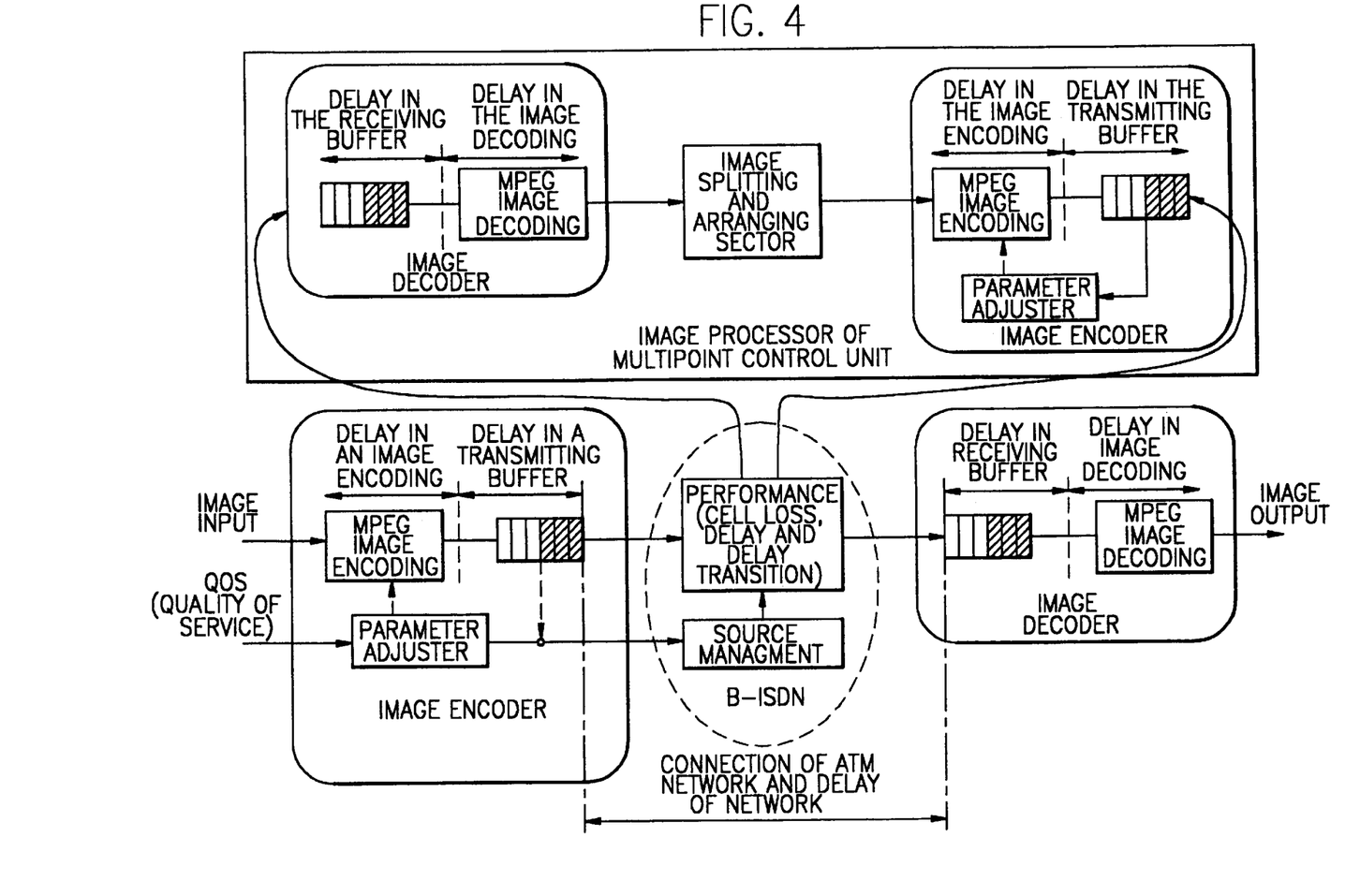
FIG. 4 exhibits a diagram showing one-way delays passing the MCU, when terminals are connected to the MCU so as to implement the multipoint multimedia communication.

Referring to FIG. 4, there is presented a diagram showing one-way delays passing the MCU, when terminals are connected to the MCU so as to implement the multipoint multimedia communication, wherein It would be understood that the end-to-end delay is greater than at least that shown in FIG. 3. In FIG. 3, in case a transcoding method is employed to implement screen-splitting functions of an image processing sector included in the MCU, it may be readily understood that the transcoding method has a substantial limit in the multipoint multimedia communication at a real time. Preferably, Functions of the screen-splitting processing sector of the MCU, therefore, requires nothing of delay elements.

Figure 6:
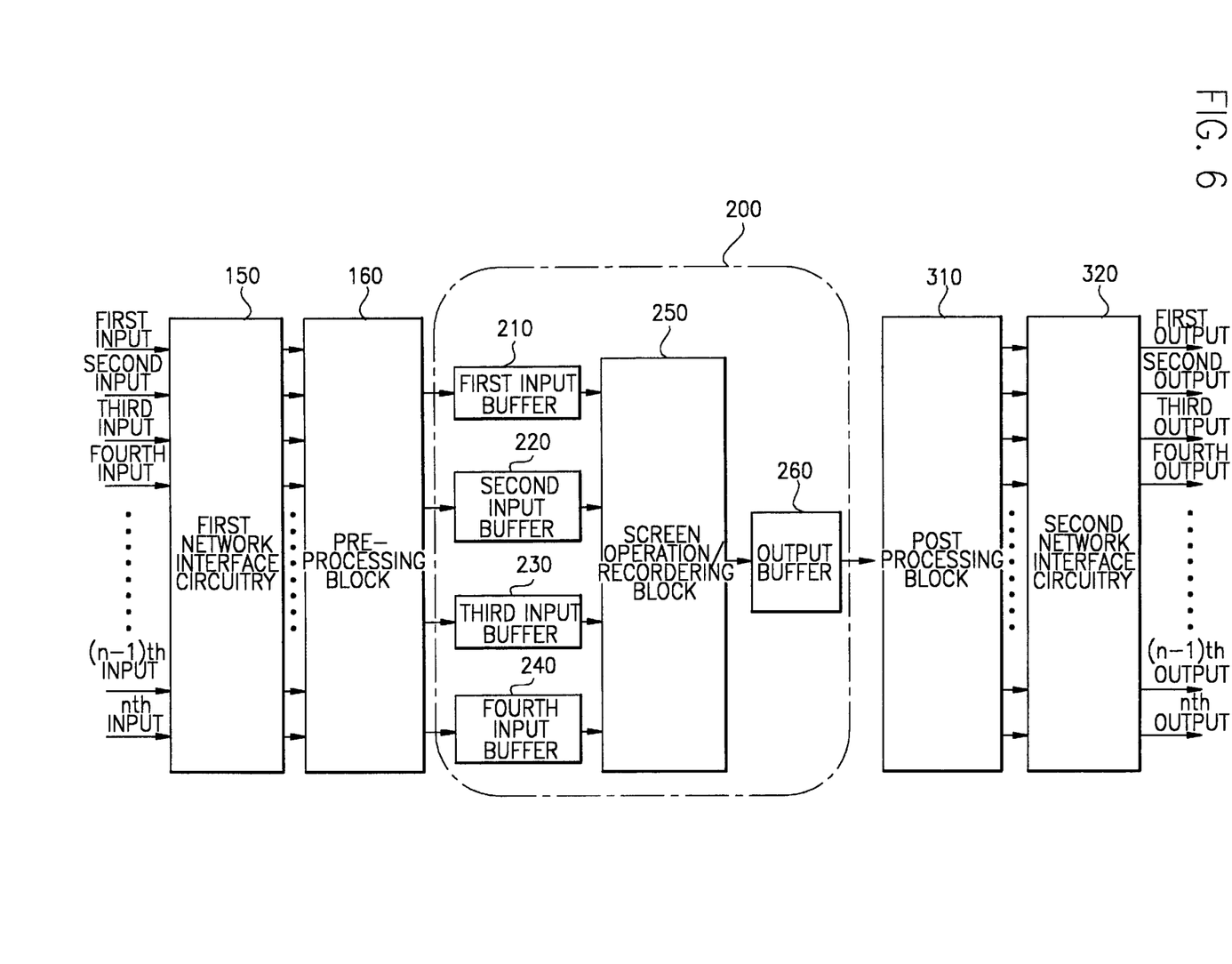
FIG. 6 denotes a block diagram showing the MCU incorporating therein a screen-splitting device in accordance with the present invention.

Referring to FIG. 6, there is presented a block diagram showing the MCU incorporating therein a screen-splitting device in accordance with the present invention, which comprises a first network interface circuitry 150 for matching a number of multimedia signals, i.e., first input, second input, . . . , (n−1)th input, nth input, applied thereto through the broadband ISDN into signal of ATM networks; a pre-processing block 160 for demultiplexing Transport Stream (TS) consisting of a plurality of media signals multiplexed at MPEG-2 system (ISO/IEC 13818-1), or Program Stream (PS) consisting of a plurality of media signals multiplexed at MPEG-1 system (ISO/IEC 11172-1) through the first network interface circuitry 150, to sort out individual media signal such as audio and video signals, e.g., four media signals; a screen-splitting processor 200 for handling and reordering the four compressed media signals fed from the pre-processing block 160 at a completely compressed domain by using the non-transcoding method; a post-processing block 310, which acts a reversed function of the pre-processing block 160, for multiplexing moving picture signals processed in the MPEG ITU-R BT601 signal format and media signals inputted thereto from audio and video processors (not shown), and generating multiplexed media signals to be corresponded to the number of multimedia communication terminals connected thereto; a second network interface circuitry 320 for outputting the multiplexed media signals to multimedia communication terminals connected thereto through the ATM networks. The media signals fed to the corresponding multimedia communication terminals is thus decoded at the user's MPEG-2 decoder to be displayed on a display unit (not shown).

More specifically, the pre-processing block 160 retrieves MPEG video Elementary Stream (ES) from the first network interface circuitry 150, which is inputted to four buffers, 210, 220, 230 and 240 in the screen-splitting processor 200. The pre-processing block 160 may be implemented through the application of end-to-end signaling (ITU-T H.245, ITU-T T.120 series) between the multimedia communication terminals in the user site and the MCU, or may be also implemented by selecting a particular speaker at an audio processor (not shown) and informing same to next processors.

As shown in FIG. 6, the screen-splitting processor 200 includes the four buffers, 210, 220, 230 and 240, a screen handling/reordering block 250, and an output buffer 260. Specifically, the four buffers, 210, 220, 230 and 240 temporally stores the four MPEG moving picture signals provided thereto from the pre-processing block 160, respectively.

In this case, when there is three multimedia communication terminals, MPEG image compressed signal with a fixed image pattern is coupled to one of the buffers, i.e., a buffer whose input of the image compressed signal thereto is emptied, which may be read successively out for processing thereof.

Figure 7:
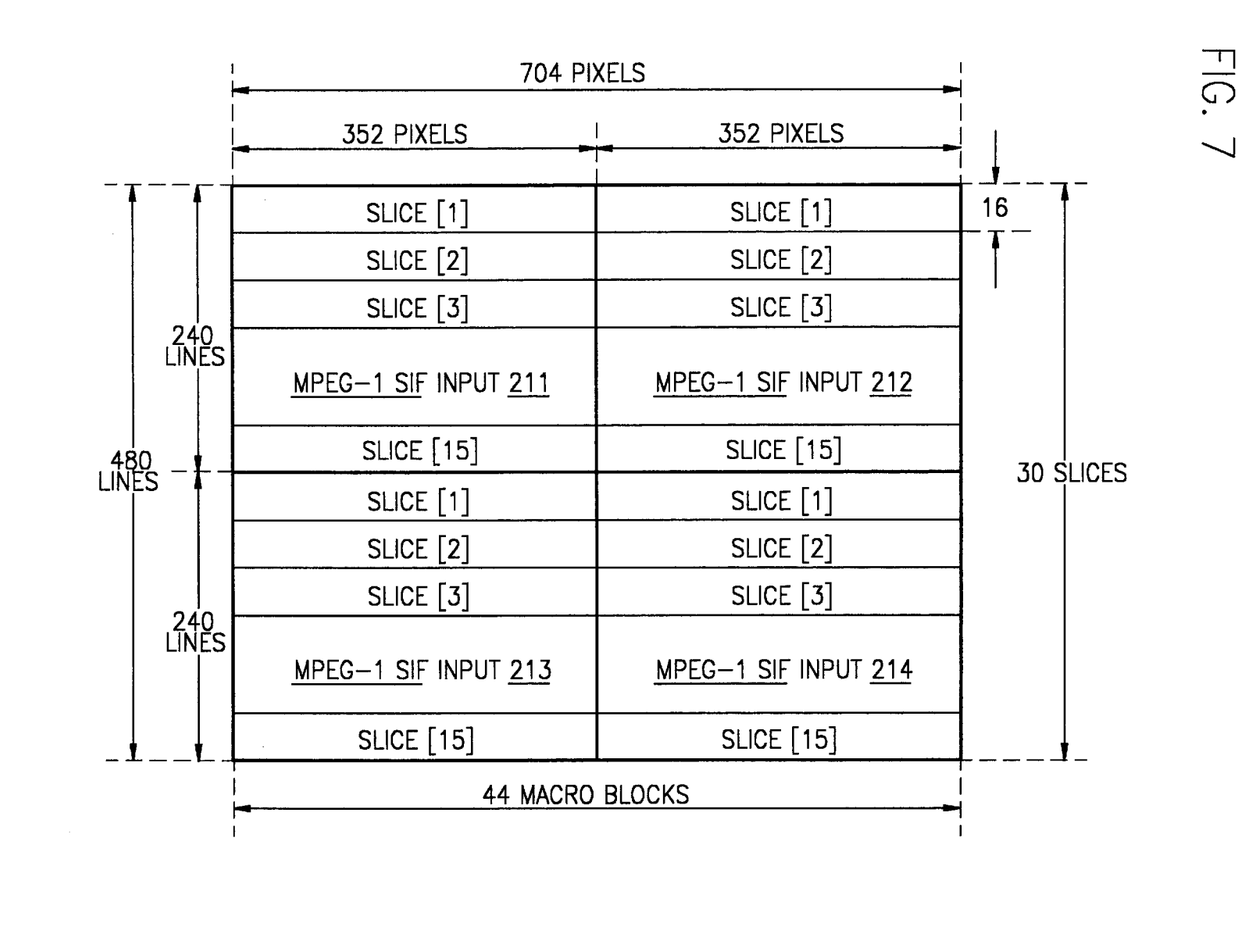
FIG. 7 deginates a diagram explaining a procedure of combining four compressed image signals with MPEG SIF pattern to obtain a combined moving picture.

The screen handling/reordering block 250 retrieves successively the compressed image signal stored in for example, the buffer 210, and output sequentially it to the output buffer 260 to be stored therein, based on a frame arrangement order as shown in FIG. 7.

When input to the buffer 210 is the compressed image signal corresponding to MPEG-1 SIF or MPEG-2 MP(SP)/LL formats shown in FIG. 7, and structure and synchronous of Group of Picture (GOP) in the compressed image signals inputted to each of the buffers 210, 220, 230 and 240 are identical from each other, the screen handling/reordering block 250 sequentially operates the compressed image signals, i.e., numbered 211, 212, 213 and 214, as shown in FIG. 7, stored in each of the input buffers, and reorders the compressed image signals 211, 212, 213 and 214, which is forwarded to the output buffer 260.

The output buffer 260 temporally stores the compressed image signals 211, 212, 213 and 214 extracted sequentially from the screen operating/reordering block 250 and then output the same to the post-processing block 310.

Referring to FIG. 7, there is shown a diagram presenting how four MPEG SIF inputs, numbered 211, 212, 213 and 214 are combined to form a simple frame with MPEG ITU-R BT601 pattern.

Figure 8A:
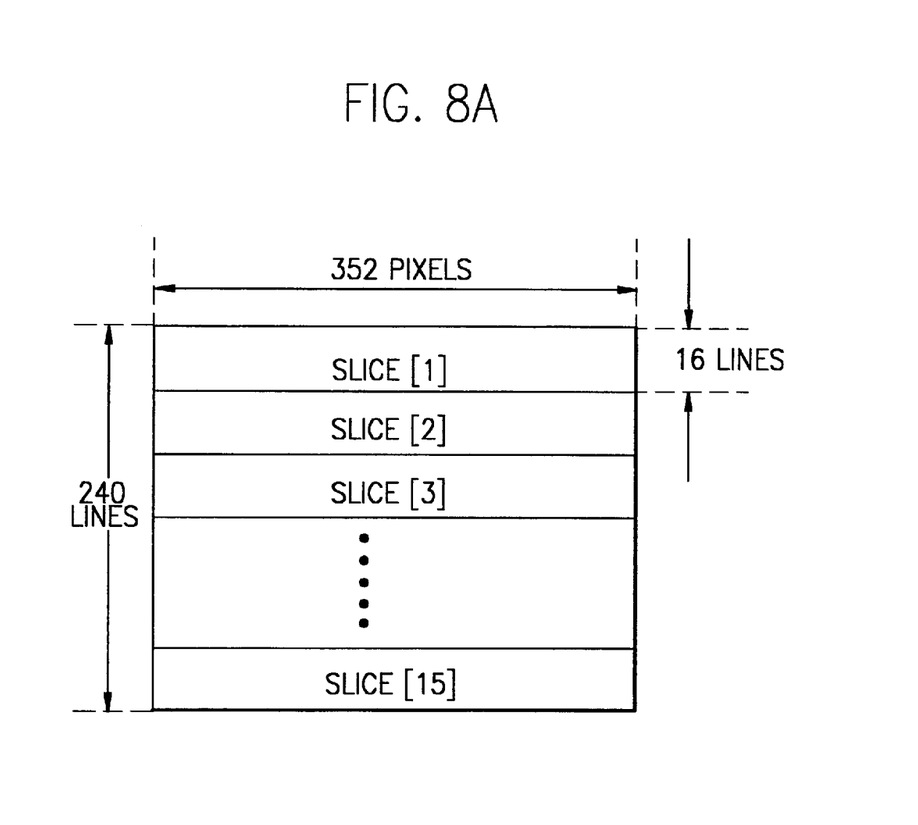
FIGS. 8A and 8B show a frame configuration for one of the MPEG-1 SIF inputs.
Figure 8B:
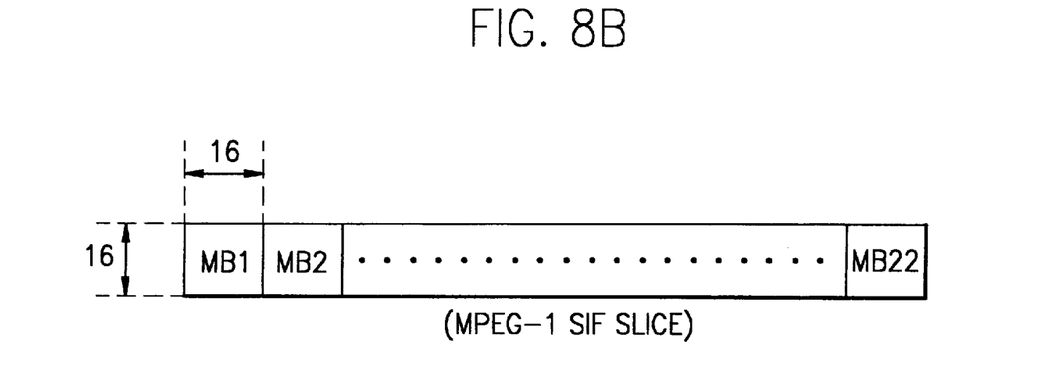

Referring to FIG. 8A, there is shown a diagram depicting a frame configuration for one of the MPEG-1 SIF inputs, e.g., 211, shown in FIG. 7, wherein the frame is comprised of 240 lines each of which having 352 pixels, the 240 lines including 15 Slices each of which having 16 lines, and each Slice is divided into 22 macroblocks, MB1, MB2, . . . , MB22 as shown in FIG. 8B.

Figure 9A:
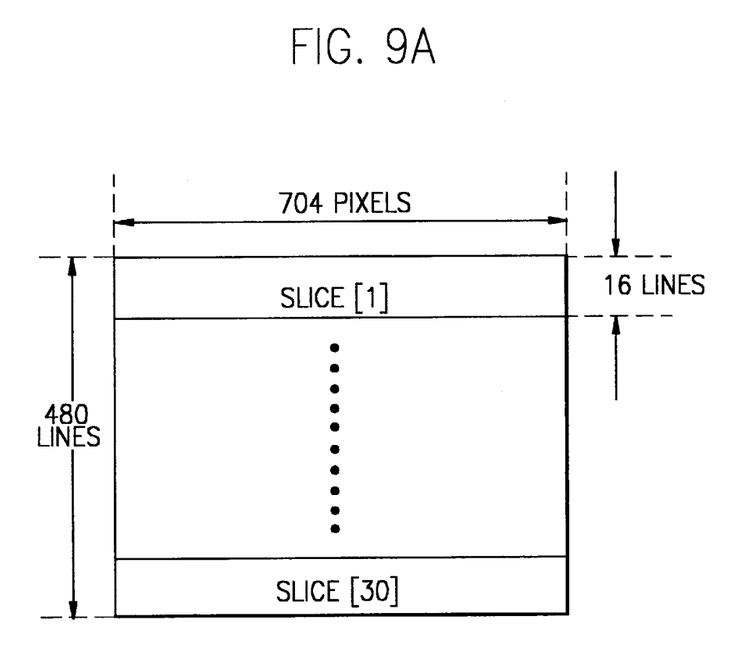
FIGS. 9A and 9B provide configuration of the combined frame with MPEG ITU-R BT601 pattern and that of each slice, respectively.
Figure 9B:
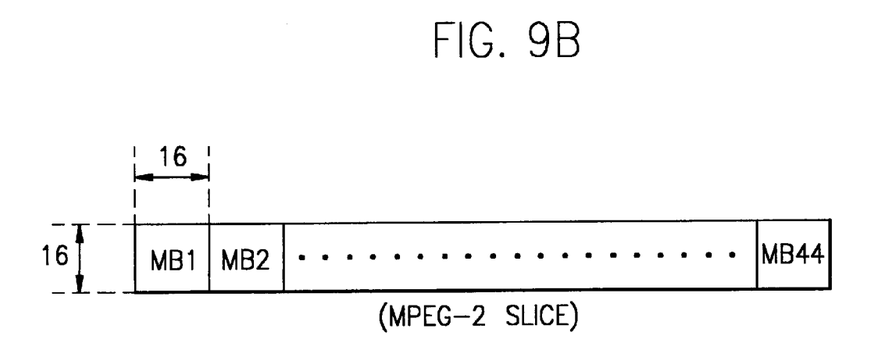

Referring to FIG. 9A, there is shown a diagram depicting configuration of the simple frame with MPEG ITU-R BT601 pattern as shown in FIG. 7, wherein the simple frame is comprised of 480 lines each of which having 740 pixels, the 480 lines including 30 Slices each of which having 16 lines. and each Slice is divided into 44 macroblocks, MB1, MB2, . . . , MB44 as shown in FIG. 9B.

Even though all possible frame configuration associated with the MPEG standard have not been offered, it may be understood that other frame configuration may be also summarized as FIGS. 9A and 9B.

Figure 10:
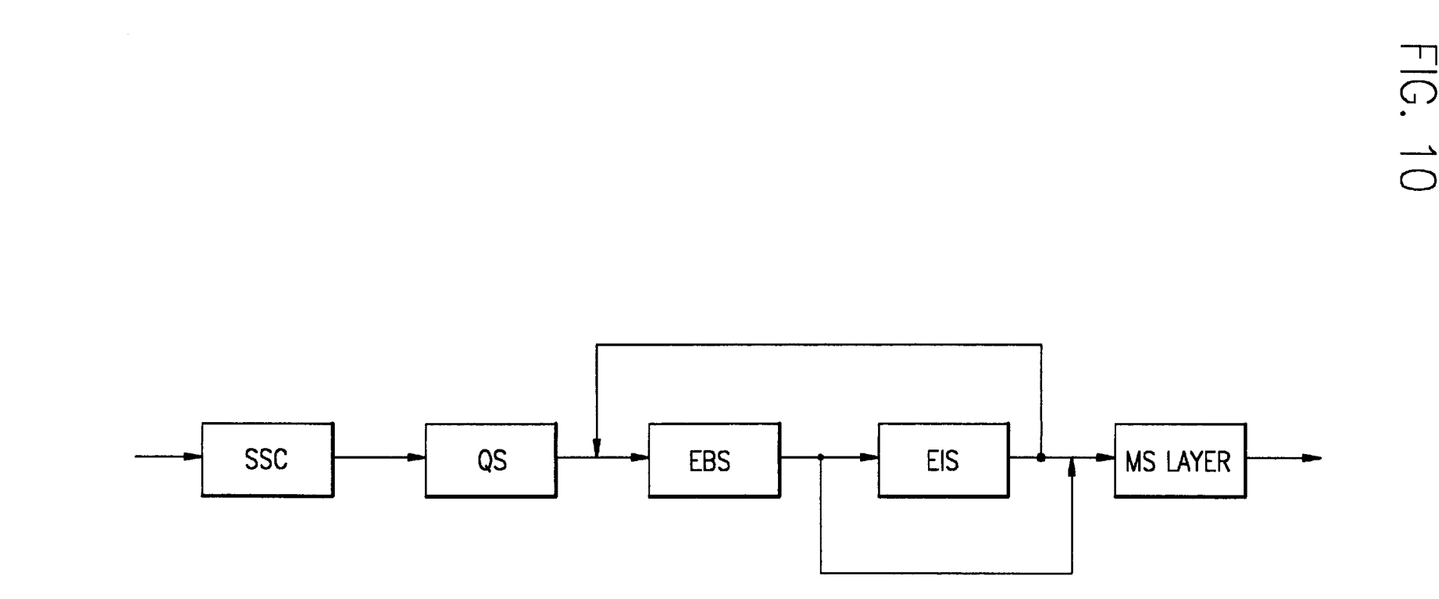
FIG. 10 presents configuration of an MPEG Slice layer.
Figure 11:
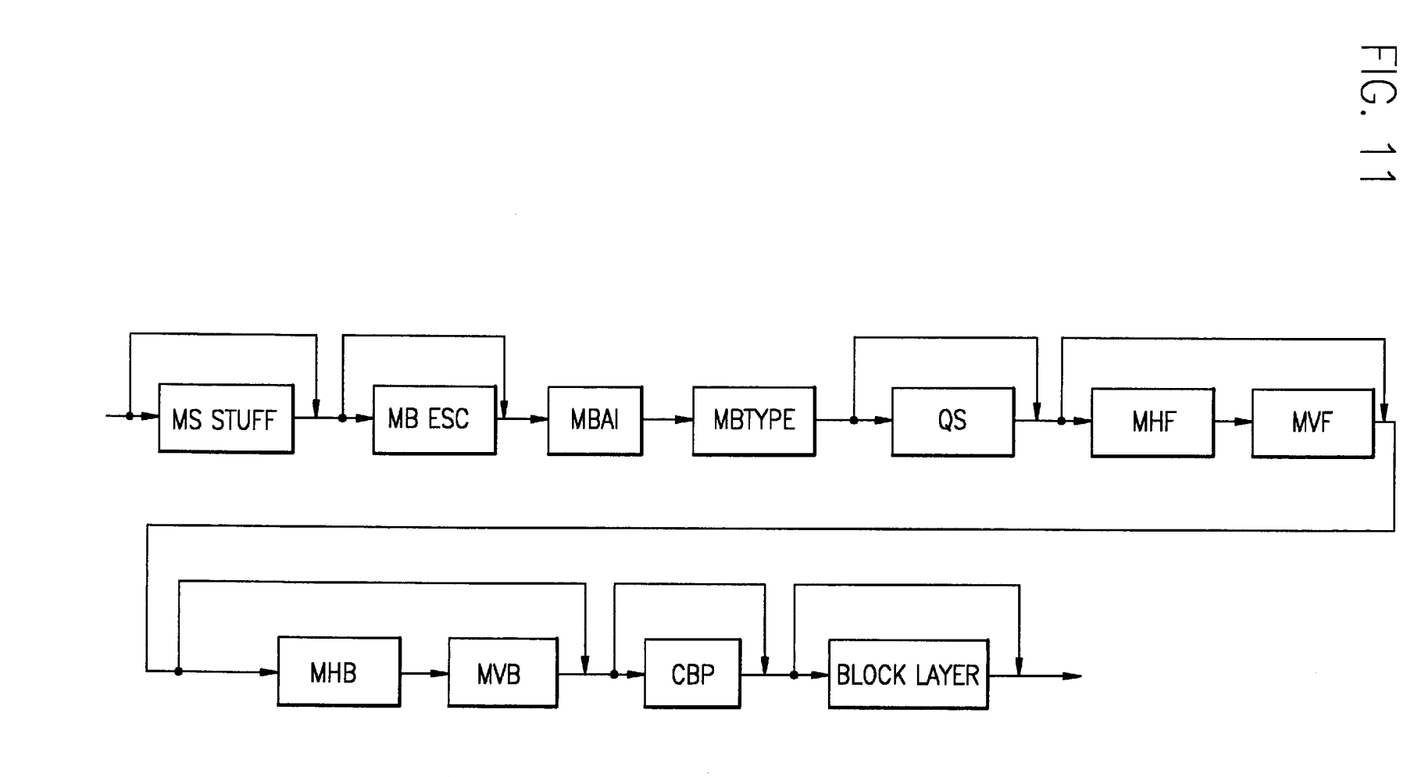
FIG. 11 offers configuration of an MPEG macroblock layer.

In FIG. 10, an MPEG Slice layer includes SSC (Slice Start Code), QC (Quantizer Scale Code), EBS (Extra Bit Slice), EIS (Extra Information Slice) and MS layer. In FIG. 11, an MPEG macroblock layer includes MS STUFF, MB ESC (Macroblock Escape), MBAI (Macroblock Address Increment), MBTYPE (Macroblock Type), QS (Quantizer Scale Code), MHF (Motion Horizontal forward Code), MVF (Motion Forward Code), MHB (Motion Horizontal Backward Cope), MVB (Motion Vertical Backward Code), CBP and Block layer.

Figure 12:
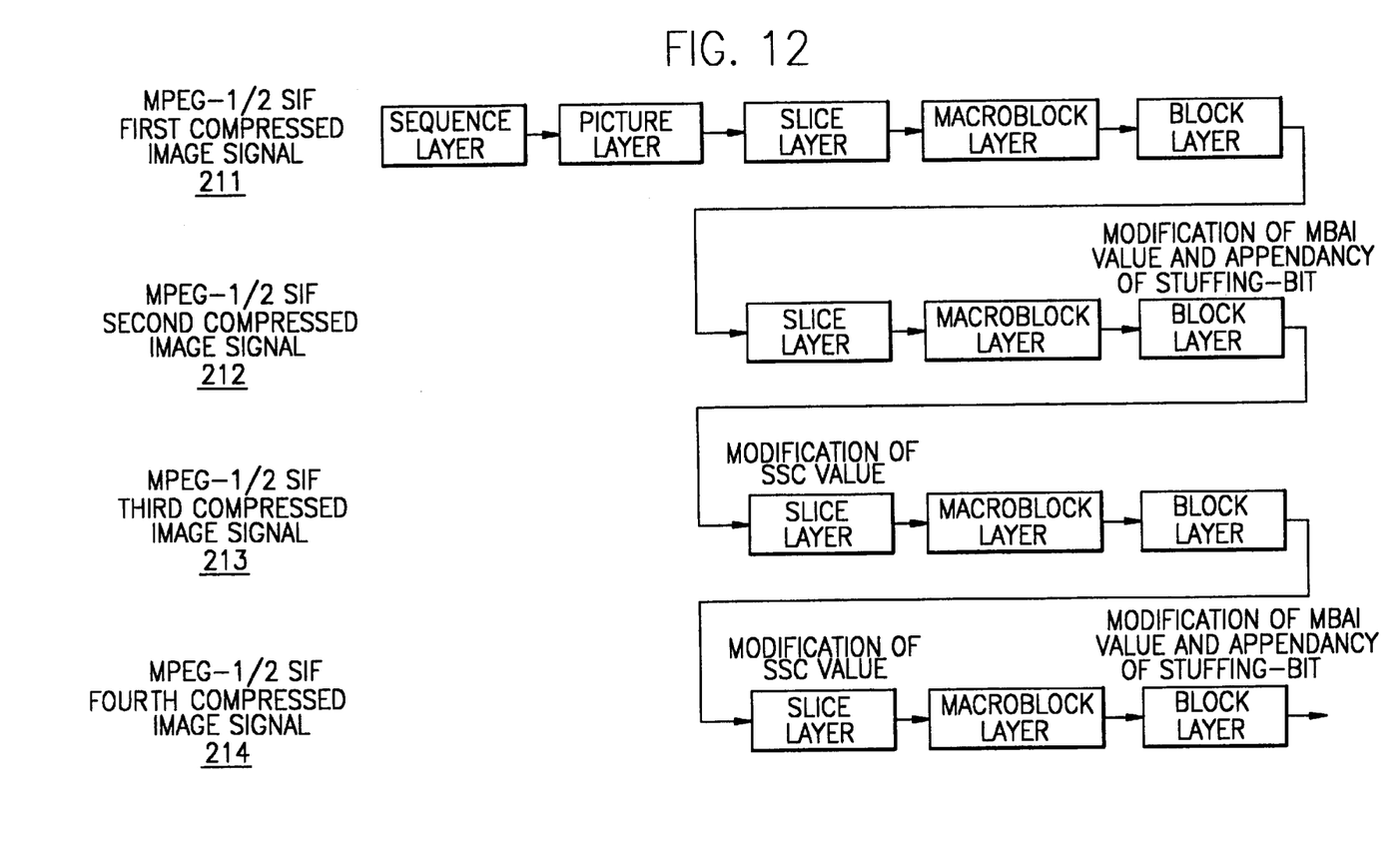
FIG. 12 depicts a diagram explaining how the four compressed image signals extracted from the input buffers are processed by the screen operating/reordering block shown in FIG. 6 according to MPEG block configuration.

Referring to FIG. 12, there is shown a diagram explaining how the four compressed image signals 211, 212, 213 and 214 extracted from the input buffers 210, 220, 230 and 240 are processed by the screen operating/reordering block 250 in the screen-splitting processor 200 shown in FIG. 6 according to MPEG block configuration.

The screen operating/reordering block 250 first retrieves the compressed image signal 211 from the input buffer 210, checks header information contained in each layer, and checks whether data on any layer currently have being inputted thereto.

In the screen operating/reordering block 250, a first slice layer information of the compressed image signal 211 is fed to the output buffer 260 without any operating therefor, and information of sequence and picture layers contained in the compressed image signals 212, 213 and 214 are deleted to obtain a single MPEG compressed image signal.

As the frame configuration shown in FIG. 7, Slice information of the compressed image signal 212 secondly fed is retrieved, and MBAI value of the macroblock layer is then changed to be identified as a macroblock contained in equal Slice. In this case, since the changed MBAI value is a code value obtained by the variable length coding, an optional stuffing bit may be added to the coded value so as to prevent arrangements of byte sequence of the MPEG compressed image signal from dispersing due to a change in the value. After Slice information (for maximum 15 slices) contained in each of the compressed image signals 211 and 212 are processed, the screen operating/reordering block 250 retrieves the compressed image signal 213 stored in the input buffer 230. Thereafter, a value of the SSC is modified to form continuous slices based on MPEG ITU-R BT601 pattern. Similar to the above procedure, Slice information contained in the compressed image signal 213 is detected and then the compressed image signal 214 stored in the input buffer 240 is retrieved for the processing thereof.

In processing for the compressed image signal 214, values of the SSC and the MBAI are modified, and a required stuffing bit is added to the modified value.

By iteratively performing the above step, the screen operating/reordering block 250 delivers a combined frame consisting of the four compressed image signals, 211, 212, 213 and 214 as shown in FIG. 7 to the output buffer 260, to be stored sequentially therein.

The output buffer 260 generates the combined frame stored therein to the post-processing block 310.

The post-processing block 310 multiplexes the combined frame fed thereto from the output buffer 260 and generates same to the second network interface circuitry 320. In the second network interface circuitry 320, n number of multiplexed outputs, are furnished to user's terminals connected thereto.

Figure 13:
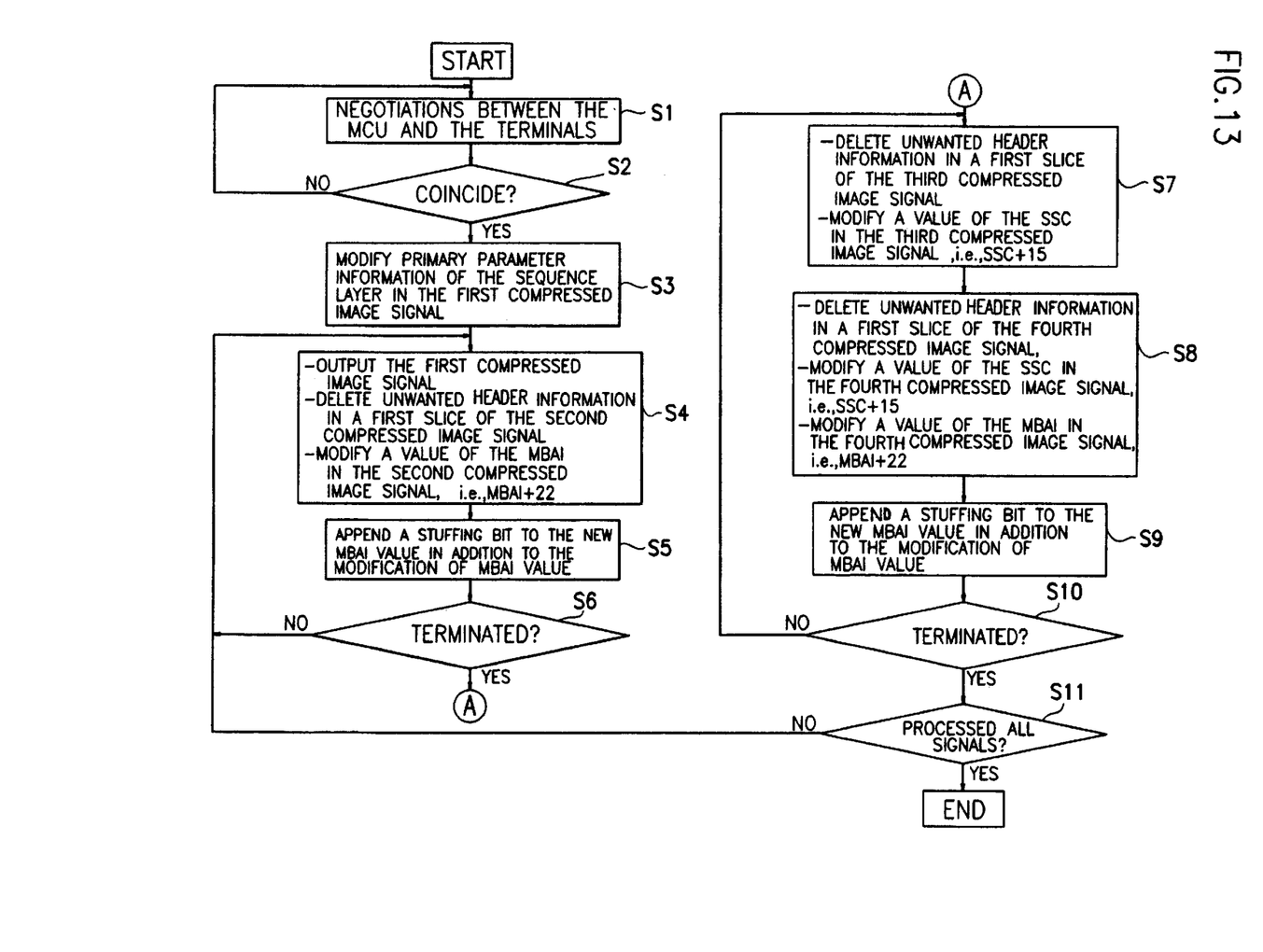
FIG. 13 illustrates a flowchart explaining a method of splitting screen with the MPEG moving picture signals at the completely compressed domain, in accordance with a preferred embodiment of the present invention.

Referring to FIG. 13, there is shown a flowchart explaining a method of splitting screen with the MPEG moving picture signals at the completely compressed domain, in accordance with a preferred embodiment of the present invention.

First, the multipoint multimedia communication service is activated by the inventive MCU. User's terminal requires a virtual channel for end-to-network signaling, and the MCU sequentially is connected to a multiplicity of terminals. e.g., 4, through the virtual channel depending on a reservation. After an network connection between the MCU and the terminals is terminated.

In step S1, negotiations between the MCU and the terminals is performed to check a type and a performance of the terminals, and assistance possible performance of the MCU to the terminals by the end-and-end signaling. In this case, Information necessary to the screen split processor 200 among the checked primary contents is an image compressed format information and a structure of the GOPs of the MPEG image, especially in case of the MPEG-1 SIF format, an agreement on which must be presented only one Slice an equal horizontal axis. In case MPEG-2, there is no the presence of one or more Slices on the equal horizontal axis.

After the termination of the end-to-end signaling negotiation, if the negotiation condition is coincided from each other, the MCU generates a start signal to the four terminals connected thereto, the start signal allowing the four terminals to generate image compressed stream to be processed to the MCU. In response to the start signal, a first terminal generates the compressed image signal, followed by a second terminal, followed by a third terminal, and followed by a four terminal. In the MCU, vertical/horizontal information, i.e., 352/240 or 352/288, among Slice information of the compressed image signal to be first processed, are transformed into 704/480 or 704/576 corresponding to the MPEG ITU-R BT601, respectively.

In step S3, the MCU vary an information field representing a compressed bit rate and that representing a capacity of the buffers for the compressed image signals based on the volume of the combined compressed image data, to thereby allow the MPEG-2 decoder to perform the decoding function thereof.

After the above step, in step S4, information for a sequence layer and a picture layer contained in a first Slice of the compressed image signal secondly inputted are deleted. a value of the MBAI is then newly changed to MBAI+22. In a subsequent step S5, a required stuffing bit is appended to the new MBAI value to be matched a byte basis of the code, as the MBAI value corresponding to a variable code is varied. In step S6, the inventive screen-splitting device checks whether both of the first and second compressed image signals 211 and 212 are completely processed, wherein the above steps S4 and S5 are repeated until the first and second compressed image signals 211 and 212 shown in FIG. 12 are completely processed, if not so. when processing for the first and second signals is terminated, the step proceeds to step S7.

In step S7, a first Slice information of the compressed image signal thirdly inputted is detected and unwanted sequence and picture layer information contained therein are deleted, and the SSCI value is then newly changed to SSCI+15. In a similar manner, in step S8, a first Slice of the four compressed image signal 214 is retrieved and unwanted sequence and picture layer information contained therein are deleted to thereby modify both of the SSCI and MBAI values, i.e., "SSCI+15" and "MBAI+22", respectively.

After the modification, in step S9, a required stuffing bit is appended to the MBAI value to be matched a byte basis of the code, as the MBAI value being the variable code is varied. Next, in step S10, it is checked whether the third and four compressed image signals, 213 and 214, are carried completely out, wherein the above steps S7 to S9 is repeated if the process for the compressed image signals, 213 and 214, is not terminated. and the step S10 proceeds to step S11 if the process is terminated.

In step S11, it is checked whether all of compressed image signals are inputted, wherein the above step proceeds to step S3 if compressed image signals to be processed are presented, to thereby allow the remaining image signals to be processed, and the above step is ended if all of compressed image signals are completely processed.

Specifically, if the termination of the screen-splitting process is required, or a currently inputted stream is detected as a final stream by analyzing header information of the input stream through the end-to-end signaling, while a procedure of splitting a consecutive moving picture screen is being performed in the compressed domain, then the screen-splitting process is ended to thereby stop all operation.

According to the process mentioned above, one of the moving picture compressed frames is processed, followed by the remaining frames, to thereby render a screen-splitted image to be displayed on a display unit (not shown) of each user's terminal.

Thereafter, virtual channels are switched through the end-to-end signaling and the end-to-network signaling, thereby being disconnected the multipoint multimedia communication terminal from the MCU to terminate the multimedia communication services.

As previously mentioned, the present invention offers the following advantages.

The present invention is first efficiently capable of splitting screen in the MPEG moving pictures, when the MPEG based compressed image signals is used in the multimedia communication terminals to implement the multimedia communication service such as a multipoint video-conference.

In addition, in comparison with the prior art method, the present invention has a merit that the interactive multimedia communication service is possible to be provided users on a real time basis, and the structure thereof is less complex than those of the prior art device.

Moreover, the present invention is capable of performing the screen-splitting function in the completely compressed domain without any degradation in the picture quality, and further minimizing a processing delay induced by the non-transcoding technique, to thereby allow the multimedia communication service to be implemented on a real time basis.

To boot, in comparison with the prior art method, the invention has a simplified structure and improved characteristics, to thereby making it possible to achieve a reduction in the fabricating cost thereof.

While the present invention has been described with respect to the particular embodiments, it will be apparent to those skilled in the art that various changes and modifications may be made without departing from the spirit and scope of the invention as defined in the following claims.

What is claimed is:

1. A method of multiplexing moving pictures fed from a plurality of multimedia communication terminals through broadband Integrated Service Distance Network (B-ISDN) and displaying a multiplexed moving picture on a display unit of the plurality of terminals, by using a screen-splitting device in a Multipoint Control Unit (MCU) including a first network interface circuitry for interfacing a plurality of media signals from the plurality of multimedia communication terminals through broadband Integrated Service Distance Network (B-ISDN); a pre-processor for demultiplexing the media signals fed thereto from the first network interface circuitry into a preset number of streams with audio, video or data; a screen-splitting processor for operating and reordering the preset number streams fed from the pre-processing means at a completely compressed domain to obtain a screen formed by the preset number streams, to thereby split the screen; a post-processing circuitry for multiplexing the screen fed thereto from the screen-splitting processing circuitry into N multiplexed screens corresponding to the terminals; and a second network interface circuitry for outputting the multiplexed screens fed thereto from the post-processing means to the multimedia communication terminals, respectively, wherein N being a positive integer, which comprising the following steps;

(a) checking a type and a performance of the terminals, and assistance possible performance of the MCU to the terminals by end-and-end signaling; and (b) sequentially retrieving frame of the moving pictures from each of the terminals connected thereto, and combining same at a completely compressed domain to generate a combined moving picture frame to each of the terminals, to thereby allow the combined moving picture frame to be displayed on a display unit of each of the terminals, said step (b) comprising:

(b1) selecting M terminals among the plurality of terminals connected thereto:

(b2) generating a start signal to the selected M terminals, the start signal allowing each of the selected terminals to generate the moving picture to be processed:

(b3) processing a first and second moving pictures generated from two terminals in response to the start signal;

(b4) processing a third and four moving pictures generated from two terminals in response to the start signal; and (b5) repeating said steps (b3) and (b4) until all of moving pictures from the selected M terminals are inputted.

2. The method according to claim 1, wherein said step (b3) includes:

(b31) modifying slice information contained in the first moving picture provided from the first terminal;

(b32) deleting information for a sequence layer and a picture layer contained in a first Slice of the second moving picture, and newly modifying by a predetermined value a value of the MBAI which is a variable code of macroblock layer;

(b33) appending a required stuffing bit to a new MBAI value to be matched a byte sequence of the code, as the MBAI value is varied;

(b34) checking whether both of the first and second moving pictures are completely processed, repeating the above steps (b32) and (b33) until it are completely processed, if not so.

3. The method according to claim 1, wherein said step (b4) includes:

(b41) deleting information for a sequence layer and a picture layer contained in a first Slice of the third moving picture, and newly modifying a value of Slice-Start-Code (SSC) to obtain a continuous slice;

(b42) deleting information for a sequence layer and a picture layer information contained the four moving picture, and newly modifying both of the SSCI and MBAI values by a preset value, respectively;

(b43) appending a required stuffing bit to a new MBAI value to be matched a byte sequence of the code, as the MBAI value is varied;

(b44) checking whether both of the third and four moving pictures are completely processed, repeating the above steps (b41) to (b43) until it are completely processed, if not so.

4. The method according to claim 3, wherein the predetermined value used in modification of the MBAI values and the preset value used in modification of the SSC values are identically applied in next modification.

* * * * *